United States Patent
Gygi et al.

(10) Patent No.: US 7,324,912 B2
(45) Date of Patent: Jan. 29, 2008

(54) METHOD, SYSTEM AND PROGRAMMING LANGUAGE FOR DEVICE DIAGNOSTICS AND VALIDATION

(75) Inventors: Carl Gygi, Colorado Springs, CO (US); Andrew Hadley, Colorado Springs, CO (US); Erik Paulsen, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 922 days.

(21) Appl. No.: 10/303,540

(22) Filed: Nov. 25, 2002

(65) Prior Publication Data

US 2004/0102978 A1    May 27, 2004

(51) Int. Cl.
*G06F 11/26* (2006.01)
(52) U.S. Cl. .............. 702/120; 702/119; 702/123; 702/117; 714/25; 714/742
(58) Field of Classification Search ............... 702/120, 702/117, 119, 127, 186
See application file for complete search history.

(56) References Cited

U.S. PATENT DOCUMENTS

| | | | | |
|---|---|---|---|---|
| 5,450,545 A | * | 9/1995 | Martin et al. | 717/109 |
| 5,778,357 A | * | 7/1998 | Kolton et al. | 707/2 |
| 5,974,253 A | * | 10/1999 | Nahaboo et al. | 717/105 |
| 6,268,853 B1 | * | 7/2001 | Hoskins et al. | 700/83 |
| 6,601,119 B1 | * | 7/2003 | Slutz et al. | 710/104 |
| 2004/0015739 A1 | * | 1/2004 | Heinkel et al. | 714/37 |
| 2004/0158812 A1 | * | 8/2004 | Dye et al. | 717/105 |

* cited by examiner

*Primary Examiner*—Hal D. Wachsman
(74) *Attorney, Agent, or Firm*—Suiter Swantz PC LLO (57) ABSTRACT

A method and system for performing diagnostics and validation operations on a device under test uses near natural language commands. A host machine controls the testing either locally or remotely, such as through the Internet. Various options for running a test or battery of tests on the device under test include entering commands through a prompt line on a graphical user interface, reading commands from a file, or manipulating graphical objects representing components or devices and operations on a graphical user interface. A script may serve as a metric to determine the successfulness of a test or battery of tests of the device under test.

27 Claims, 6 Drawing Sheets

METHOD, SYSTEM AND PROGRAMMING LANGUAGE FOR DEVICE DIAGNOSTICS AND VALIDATION

FIELD OF THE INVENTION

The present invention generally relates to the field of device testing, and particularly to a method, a system, and a programming language for diagnostics and validation.

BACKGROUND OF THE INVENTION

A host system may execute many groups of operations through a particular device or vice versa. These sets of operations must be tested with varying parameters of execution to fully test device functionality to ensure reliability of operation. Although many devices may be tested with the same set of tests and test parameters, the methods of hardware execution may be different. Thus, it may be necessary to run a set of tests with varying parameters in a specific order, frequently (such as daily regression tests), or simultaneously. Even equipment with diagnostic ports may require non-trivial testing in which separate test codes must be written for different components of a device under test even if the same feature, such as the data integrity of an internal memory, is being tested.

Current device testing is performed by one of two methods. The first method requires that the test be written from scratch. The operator must understand the intricacies of the device being tested, have competent knowledge of programming skills, and be versed in the testing methodology. Thus, the first method requires intensive effort and limits the number of people who can test the device. The second method involves the creation and use of a set of library functions using an existing programming language capable of performing complex operations. Many executable files may be created that are then hard to track and document. The test writer also must master the programming language the executable files are written in and understand the functions and operations the executable files perform. The second method requires that the library functions be compiled and, perhaps, linked. The second method also requires considerable time and effort from the test writer.

Therefore, it would be desirable to provide a programming language that facilitates device validation and a method and system that uses the programming language.

SUMMARY OF THE INVENTION

Accordingly, the present invention is directed to method and system for performing diagnostics and validation operations on a device under test using near natural language commands.

In a first aspect of the present invention, a method for testing a device through a host machine includes the steps of accessing a device under test, entering a near natural language command, interpreting the near natural language command, and performing at least one operation associated with the near natural language command.

In a second aspect of the present invention, a system for debugging a device from a host machine includes a host machine and a device under test coupled to the host machine. The host machine, device under test, other devices, and processes communicate through a message passing technique. Communications may be accomplished through a near natural language programming language.

In a third aspect of the present invention, a program of instructions storable on a medium readable by an information handling system causes the information handling system to execute steps for performing diagnostic and/or validation operations on a device under test. The program of instructions includes instructions for accessing a device under test, entering a near natural language command, interpreting the near natural language command, and performing at least one operation associated with the near natural language command.

The present invention reduces the amount of time to write code to verify hardware/software functionality within a system, requires little or no knowledge of low level programming or hardware operation by a test coder, permits reusability of test code on may different pieces of hardware or software, allows integration with other tests, offers portability, and allows an operator to run a script and record the results without understanding the complexities of the test and methods involved in a previously written test.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention relates to a method and system for testing a device using a near natural language programming language. The present invention also relates to a near natural language programming language having a set of library functions to provide easy and effective use by a test writer. The programming language is especially designed for diagnostics of a bussed device that uses a message passing technique. Message passing allows processes running on multiple processors to cooperate in solving problems. The main advantages of establishing a message-passing method are portability and ease-of-use. In a distributed memory communication environment in which the higher level routines and/or abstractions are built upon lower level message passing routines, message passing methods provide a clearly defined base set of routines that may be implemented efficiently or provide hardware support to enhance scalability. For example, Fusion Message Passing Technology (MPT) architecture, using industry standard ARM processor technology, may use the same device driver that supports several different physical interfaces. A script program written in the programming language may be used to perform complex operations.

Figure 1:
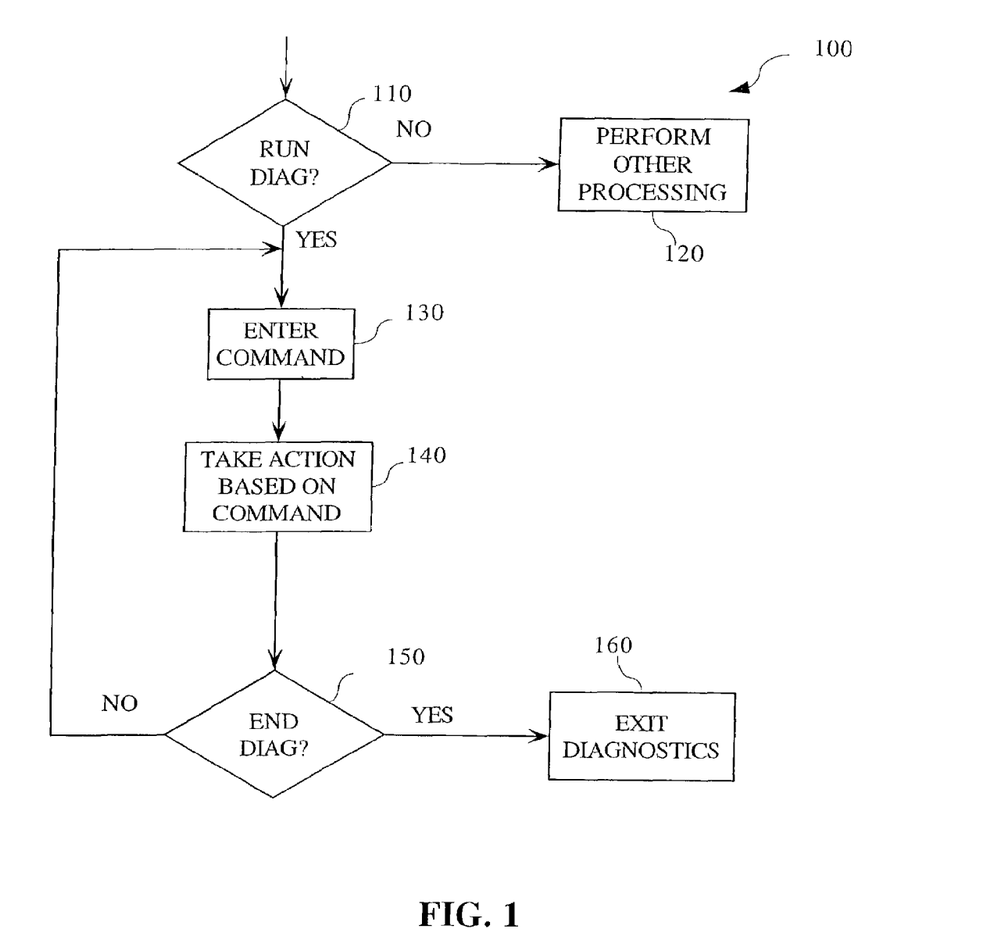
FIG. 1 illustrates an embodiment of the general method of the present invention.

FIG. 1 shows an embodiment 100 of the general method of the present invention. If it is determined that no diagnostics are to be performed 110, other processing continues 120. Otherwise, a command is interpreted 130. An operation is performed 140. If it is determined that another command is to be entered 150, processing returns to step 130. The method may be used in a mode that requires all operations pertaining to one command be completed before executing another command. Alternatively, parallel operations from multiple commands may be performed simultaneously. If not other command is to be entered, diagnostics mode is exited 160. For a device and/or software under development, the method of the present invention may be used for regression testing to ensure that bugs have not been introduced by any modifications to the software or hardware. An automated remote host could run a set of tests at a certain time of day to allow automated regression testing.

Figure 2:
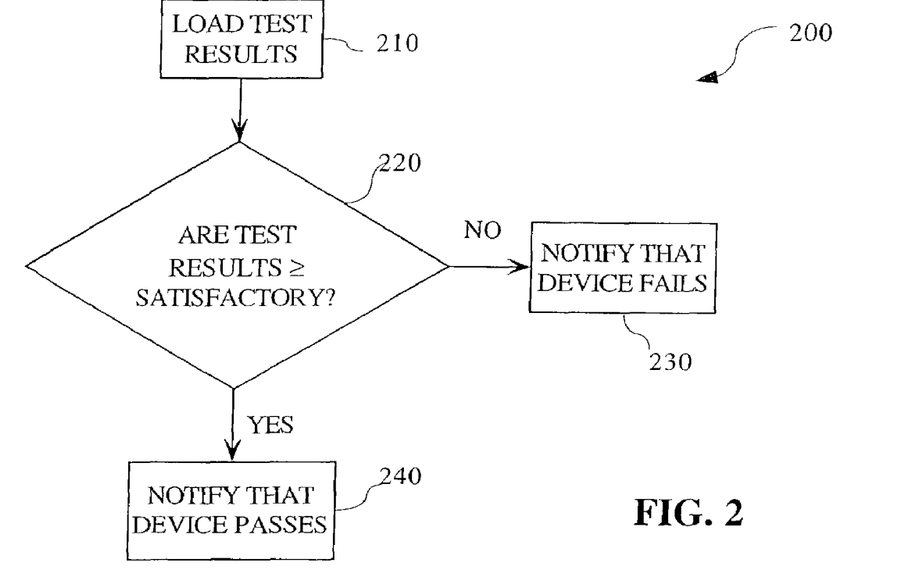
FIG. 2 illustrates an embodiment of an aspect of the method of the present invention.

FIG. 2 shows an aspect 200 of the present invention in which a pass/fail evaluation is performed for a device under test. Test results are loaded into a processor 210. If it is determined that the test results exceed a threshold level 220, a notification is made that the device passes 240. A script may serve as a metric. For example, if 100% of the tests performed within a script A pass device B, then device B may be considered valid. If the test results do not exceed a threshold level 220, a notification issues that the device under test fails 230. The notification may be accomplished through a text file, a graphical representation, an indicator light, an audible buzzer, and the like, alone or in combination.

Figure 3:
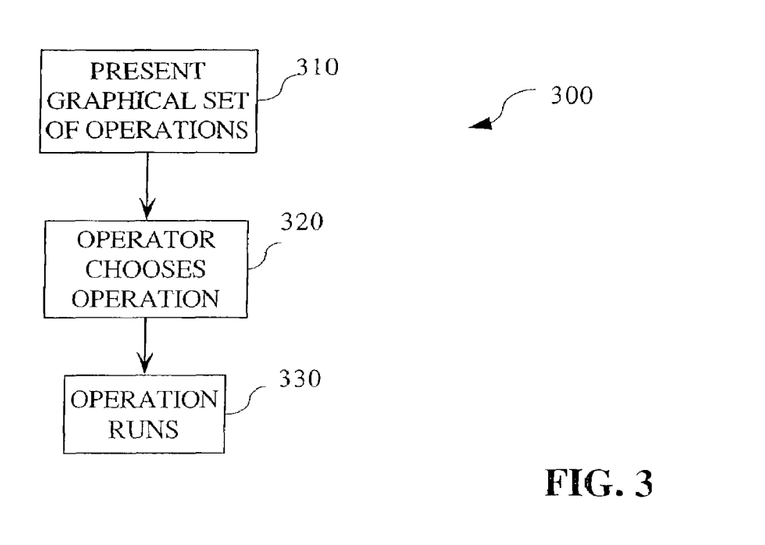
FIG. 3 illustrates an embodiment of another aspect of the method of the present invention.

FIG. 3 shows an aspect 300 of the present invention in which an operator chooses the tests to be run. The operator may be presented with a graphical representation of possible tests 310. The operator chooses the program to be run 320. The program may then generate a script based upon a flow diagram drawn by the test coder. This would allow a coder with a hardware background to code by relating the coding effects to a flow diagram of hardware operation without having to understand how to program, compile, link, and execute code. The program runs 330.

Figure 4:
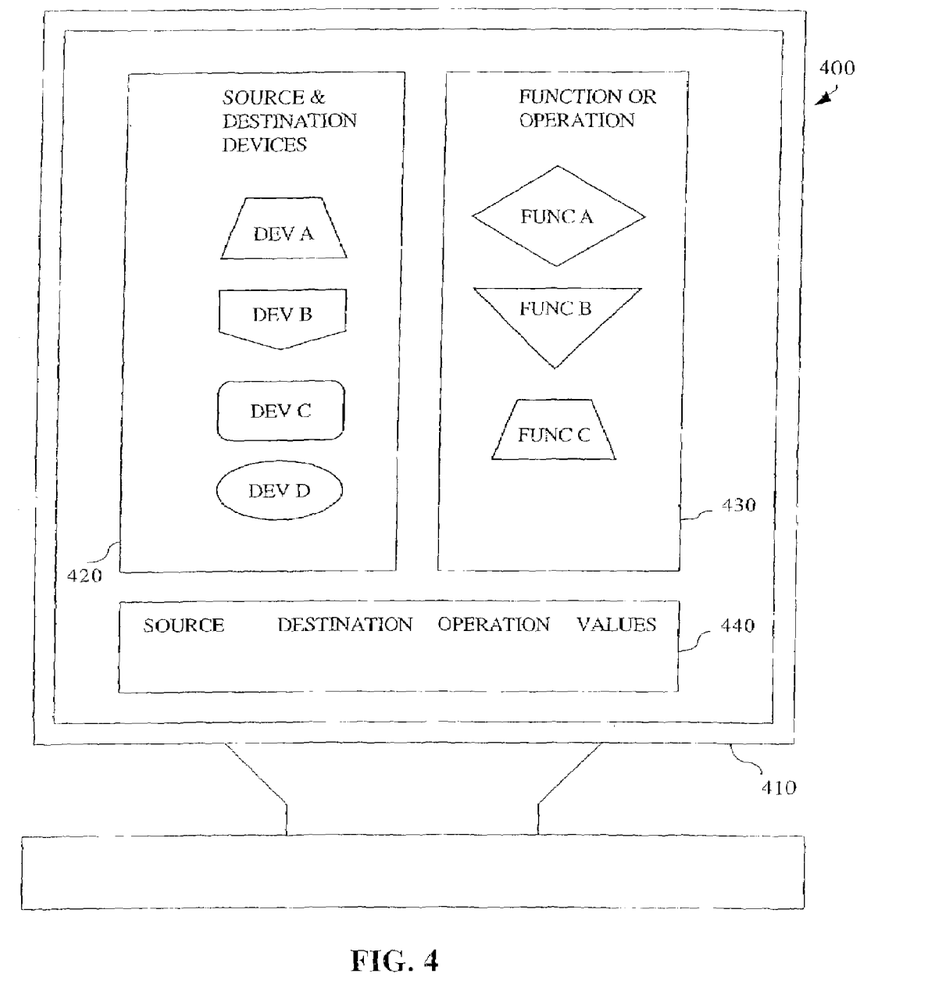
FIG. 4 illustrates a graphical user interface presenting graphical objects to represent devices and operations according to an embodiment of the present invention.

FIG. 4 shows an exemplary embodiment 400 of the use of graphical objects to perform the diagnostics and/or validation tasks of the present invention. A list 430 of graphical objects may be displayed on a portion of a display device screen 410 in which each graphical object represents a function. One or more other lists 420 of graphical objects represent devices that are operated on with reference to the function. Although a single list of graphical objects for devices is shown, there may be separate lists for source devices and destination devices. A window 440 may be displayed to allow an operator to drag graphical objects to a particular field for a command.

Figure 5A:
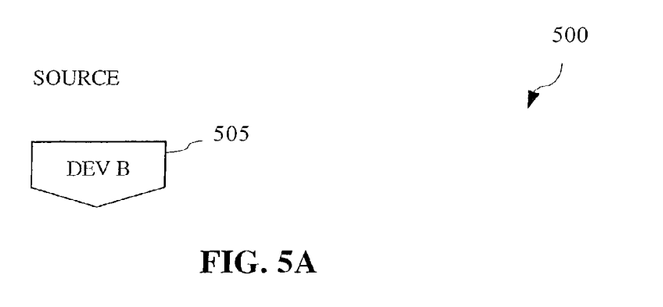
FIGS. 5A, 5B, and 5C illustrate an exemplary sequence of manipulating graphical objects from FIG. 4.
Figure 5B:
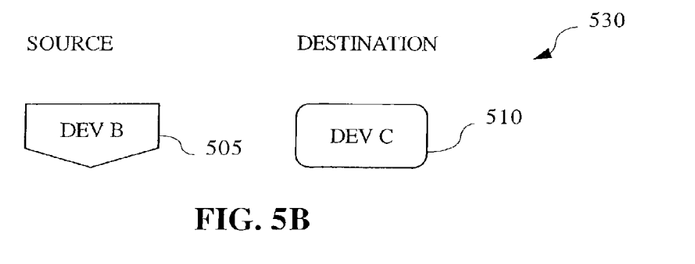
Figure 5C:
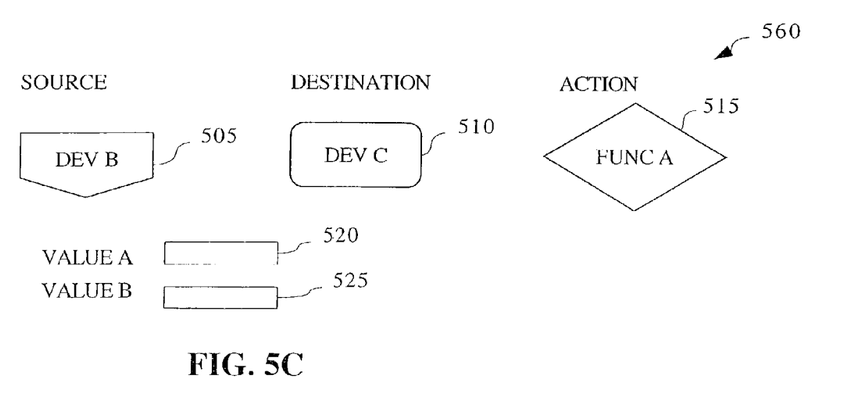

FIGS. 5A, 5B, and 5C show a sequence of manipulative operations for using the graphical objects to set up a command in an embodiment 500, 530, 560 of the present invention corresponding to window 440 of FIG. 4. Drag and drop operations may be used to facilitate forming a command. FIG. 5A illustrates an initial step of selecting a source device 505. The initial step may be the selection of a destination device or an operation. FIG. 5B shows the selection of a destination device 510. FIG. 5C shows the selection of an action or operation 515. Other fields 520, 525 for data entry may be present or may appear upon the selection of an action 515.

Figure 6:
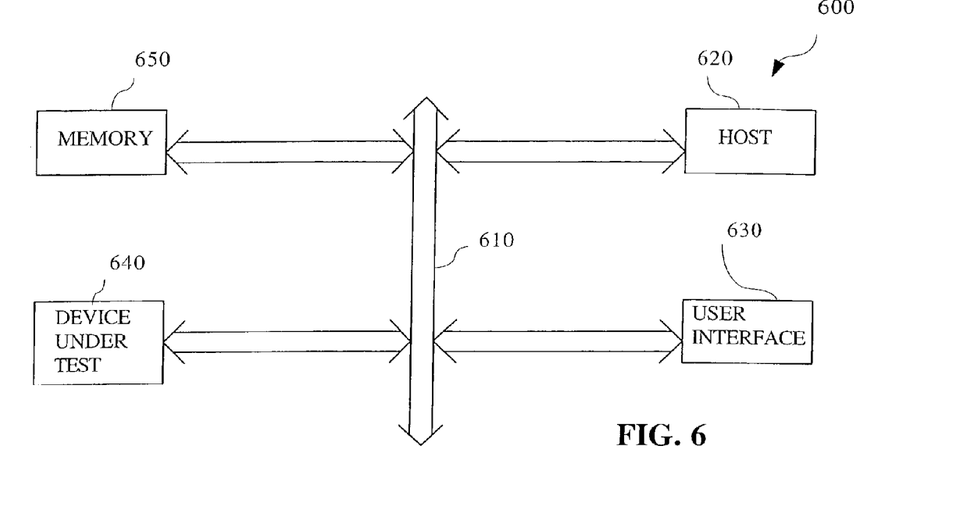
FIG. 6 illustrates a first embodiment of a system of the present invention.

FIG. 6 shows a first embodiment 600 of a system employing the method of the present invention. The device under test, the host, and other components may communicate across a bus 610. The host preferably is, includes, or is operatively coupled to a high speed processor. The bus may be a Peripheral Component Interconnect (PCI) bus. The device under test 640, the host 620, and the user interface 630 may share a memory 650. Alternatively or additionally, each device may have its own memory.

Figure 7:
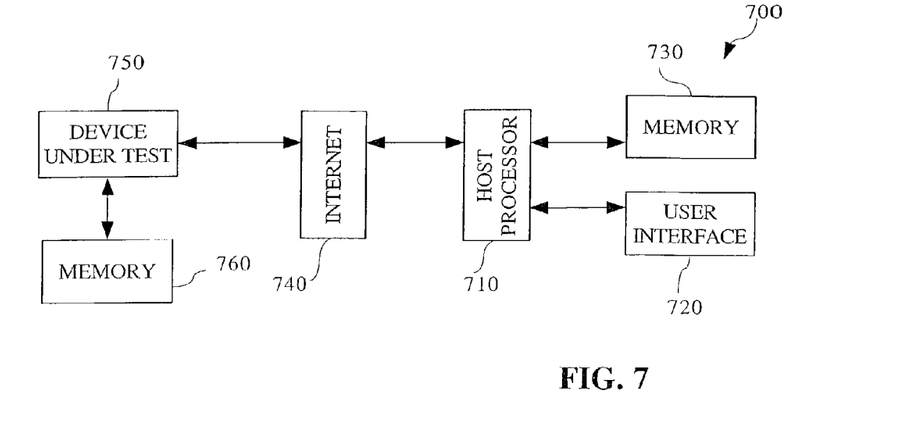
FIG. 7 illustrates a second embodiment of a system of the present invention.

FIG. 7 shows a second embodiment 700 of a system employing the method of the present invention. The host 710 tests the device 750 through a network, such as the Internet, to allow for remote operations. Remote operations may allow cost savings for the testing facility and permit device operators to fix equipment problems in a greater variety of environments and locations. The host 710 may have a memory 730 and be operatively coupled to a user interface 720. The device under test 750 may have a memory 760.

The present invention may be employed in a variety of uses, such as equipment diagnostics. For example, a storage controller may have a diagnostic access port that allows a system to modify internal registers that normally are not visible. Port operation is a non-trivial activity that is manageable by a wide range of personnel using the method and/or system of the present invention.

A variety of near natural language programming languages may be used with the present invention. The term "near natural language programming language" describes a language that has descriptive function, library, or subroutine names that are formed from natural language, such as COBOL. The near natural language programming language facilitates high level automated testing operations used for hardware and software validation of a device in which a multitude of component parts of the device may be tested. The near natural language programming language may be run from a test file by an execution host or may be used in testing across a network, such as the Internet, to allow a remote host to control one or many test systems or one or more pieces of hardware. The near natural language programming language offers further versatility by permitting an operator to use the language on the command line type prompt to run a test while debugging hardware failures. An optional feature of the near natural language programming language is built in documentation constructs that export information about a test to an execution host. The documentation may be displayed to an operator during testing. The near natural language programming language preferably allows importing of previously written script files for use in script files being developed.

The present invention also relates to a near natural language programming language for performing diagnostics. The following paragraphs describe this simple scripting language, Validation Diagnostic Script (VDS). The primary purpose of VDS is the use of diagnostic accesses to validate an MPT compliant device or a rapid prototype version of an MPT compliant device.

VDS scripts may be either compiled or interpreted. Compiling entails the distillation of a text representation of a script into a machine language representation of the script that can be directly executed one instruction at a time. Interpreting entails executing the script with just the textual representation of an operation to execute. A directive is a pre-compiler. The pre-compiler is run regardless of whether the script is compiled or interpreted as these directives need to be expanded or executed to create the actual textual representation of the script for compilation or interpretation.

Other programming languages and/or message passing techniques may be used with the method and system of the present invention. Certain definitions applicable to the near natural language programming language, such as VDS, are provided immediately below. Where a term has not been defined, shown, or otherwise disclosed within the current application, the meaning of the term is in accordance with standard hardware and software terminology such as defined by the Computer Desktop Encyclopedia, $9^{th}$ Edition.

Execution Host: The program that executes the operations of a VDS script as specified in this document.

Execution Location: A value or multiple values that represent the current location in a script that is being executed.

Keyword: Any operation name or compiler directive.

Operation: The name used to describe the smallest unit of functionality of a script.

Symbol: A symbolic representation of a value, memory pointer, script location or function. The name of a symbol cannot be the same as a keyword.

Pointer: A symbolic representation of a memory location or a constant value of a memory location.

Scope: A symbolic representation of the visibility of symbols or the extent of access of symbols.

Script: A grouping of one or more statements, identifiers, directives, or comments.

Type: The category of value of a symbol (i.e., VARIABLE, FUNCTION, POINTER, LABEL).

There are five basic language symbol types in the VDS language: VARIABLE, STRING, POINTER, LABEL, and FUNCTION. POINTER is a value type that is semi-modifiable. No math or assignment operations are allowed to modify a pointer type. The container size of this type is not defined by VDS but is dependent on the system on which the execution host runs. The meaning of the value is also defined by the operations that create and use the value (e.g., for IO operations the pointer operation could be a 16 bit port number and for a memory operation it could be a 64 bit address).

There are a variety of modifiable types. These include variable, string, semi-modifiable types, and pointer. No math operations are allowed with string types. Semi-modifiable types have implementation specific values that are used by certain operations and cannot be modified by math or assignment operations.

Non-modifiable types have implementation specific values in the language and cannot be modified by any operation within the language. Non-modifiable types include label, function, language syntax (VDS files as defined here must be fully ASCII compliant text files), and special characters. Special characters include # (used to begin a comment), % (identifiers begin with this character), "(literal strings begin and end with this character), separator (,) (separates items in an argument list), statement completion (;) (used to end statements), '\n' (new line, used to complete a comment, an identifier, or a directive), scope (.) (used to specify that the symbol following the period will be found in the scope named by the scopename preceding the period), directive (') (used to tell the compiler important information needed to compile the script, and white space characters (used to separate words when no other separator is present). White space characters include '\n', '\r', space, and tab. All white space characters are ignored, except those that are used specifically as delimiters for the purpose of syntax. Extra white space characters may be added anywhere in a script with no effect on the actual meaning of the script.

An identifier begins with a (%) character followed by an identifier name, followed by one or more white space character(s) (white space characters in this case cannot include the newline character), followed by a literal string completed by a new line character.

Examples of Identifiers:
% NAME, "FwDownloadBoot":
% PURPOSE, "To load firmware image on an MPT device using FwDownloadBoot";
% WorkAroundWarning, "This script has a work around that will only work on rev b0";

A directive tells the compiler important information needed to compile the script into an executable form. The following is a representative list of the directives and their purpose.

'DEFINE symbol any text you want to put before the newline character is a directive that instructs the compiler to replace all occurrences of symbol 'symbol' with the string of characters starting at the first non-whitespace character following the symbol name to the first newline character encountered. A directive begins with a (') character, followed by a directive name followed by information that is defined individually by each separate directive and is completed by a new line character.

Examples of Directives
'DEFINE ARM_ENABLE_BIT 0x21
'INCLUDE fwboots.vds FwBoot

'IMPORT filename scopename is a directive that instructs the compiler that another script file is needed to compile this script file. The IMPORT directive also states that this file will use scope name 'scopename' to access symbols in the script file named by 'filename'.

'EXPORT symbolname string instructs the compiler that another script file could use a symbol declared in this script. The EXPORT directive also gives a string that describes the purpose of the symbol. All symbols exported can then be viewed with a description of the purpose of each symbol. Currently only function symbols may be exported.

A script may use as many other identifiers as needed. These script-defined identifiers may use any identifier name that has not previously been used in that script. Multiple identifiers with the same identifier name are not allowed. The following are the mandatory identifiers required for every script: % NAME, % VERSION, % PURPOSE, and % SUPPORTED_DEVICES. % NAME literalString uses the string 'literalString' to give the host execution platform the name of the script and allows descriptive names for scripts. % VERSION literalString uses the string 'literalString' to give the host execution platform version information about the script. % PURPOSE literalString uses the string 'literalString' to give the host execution platform purpose and function of the script. % SUPPORTED_DEVICES literalString uses the string 'literalString' to give the host execution platform a list of devices it was intended to be used on.

Language Core Operations are simple, primary operations may be performed by a VDS interpreter or compiler. The language core operations include non-executable operations, executable operations, flow control operations, assignment operations, math operations, and memory operations. Non-executable operations may include declaration operations such as VARIABLE, POINTER, LABEL, FUNCTION, and STRING. Executable operations may include BEGIN_FUNCTION, END_FUNCTION, CALL, PUSH, and POP. Flow control operations may include JUMP, BRANCH, RETURN, CONDITION, and BREAK. Assignment operations may include ASSIGN. Math operations may include ADD, SUB, MUL, DIV, MOD, ADD, SHFTL, SHFTR, OR, XOR, and NOT. Memory operations may include READ_MEM, WRITE_MEM, READ_PCI_MEM_32, WRITE_PCI_MEM_32, READ_PCI_MEM_16, WRITE_PCI_MEM_16, READ_PCI_MEM_8, WRITE_PCI_MEM_8, READ_PCI_IO32, WRITE_PCI_IO32, READ_PCI_IO16, WRITE_PCT_IO16, READ_PCI_IO8, WRITE_PCI_IO8, READ_PCI_CONFIG32, WRITE_PCI_CONFIG32, READ_PCI_CONFIG16, WRITE_PCI_CONFIG16, READ_PCI_CONFIG8, WRITE_PCI_CONFIG8, GET_PCI_DEVICE_LOCATION, and GET_PCI_MEMORY_REGION_BASE.

Language Standard Library Operations are complex operations that include widely used scripts. These operations simplify the writing of scripts. These operations may be implemented using only language core operations. Language standard library operations may include flow control operations, memory operations, file operations, and message passing device operations. Flow control operations may include Delay. Memory Operations may include AllocateMemoryBuffer, MemorySet, MemoryCompare, and MemoryCopy. File operations may include ReadFileToBuffer and WriteBufferToFile. Message passage device operations, such as MPT device operations, may include MptGetDevice, MptGetDeviceInfo, MptGetDeviceRegisterIOBase, MptGetDeviceRegisterMemoryBase, MptGetDeviceRegisterMemoryMask, MptGetDeviceDiagnosticMemoryBase, MptGetDeviceDiagnosticMemoryMask, MptMemDiagWrite32, MptMemDiagWrite16, MptMemDiagWrite8, MptMemDiagRead32, MptMemDiagRead16, MptMemDiagRead8, MptIODiagWrite32, MptIODiagWrite16, MptIODiagWrite8, MptIODiagRead32, MptIODiagRead16, MptIODiagRead8, MptEnableDiagModeMem, MptDisableDiagModeMem, MptUnlockDiagRegMem, MptLockDiagRegMem, MptResetDeviceMem, MptEnableIOpArmMem, MptDisableIOpArmMem, MptEnableDiagModeIO, MptDisableDiagModeIO, MptUnlockDiagRegIO, MptLockDiagRegIO, MptResetDeviceIO, MptEnableIOpArmIO, and MptDisableIOpArmIO. IOP refers to Input/Output Processor. ARM refers to Advanced RISC Machine.

Host Library Operations are generally widely used operations that will generally be implemented separately in each implementation, due to necessary interaction with a particular VDS host. One example is user input and output. This section of operations is also expandable by the execution host implementer. Host library operations may include Print, GetUserString, GetUserChar, and MptGetSelectedDevice. MptGetSelectedDevice permits the writing of script that allows the user to select device the script will operate on.

There are a variety of Language Operation Syntax and Usage. Representative examples of Core Operation Usage follow.

RETURN pops an execution location off of the stack and modifies the next execution pointer to be placed at the location popped off the stack.

CALL function, variable, value0, value1, . . . pushes the next execution location and zero or more values, in order, onto the stack starting at the left most value listed. Starts execution at the beginning (BEGIN_FUNCTION) of the identified function. When the function completes the CALL operation will pop the value returned by the function off of the stack and place the return value in the symbol specified by 'variable'.

PUSH value pushes the value of the symbol 'value' or the constant 'value' onto the stack.

POP variable and POP pointer pops a value off the stack and places the value into a symbol specified by 'variable' or a pointer specified by 'pointer'.

CONDITION value0, conditional, value1 determines whether or not the next operation is executed (only affects the next executable statement). The next operation is executed if (value0 condition value1) evaluates to a non-zero value.

EXAMPLE

CONDITION count, !=0; JUMP done;

If variable count is not equal to zero the JUMP operation will be executed otherwise the JUMP operation will not be executed.

Various other core operations may be included in the programming language. For example, XOR variable, value, value1 equates to variable=−value0 ^ value1. NOT variable, value0 equates to variable=−value0. SHFTL variable, value, value1 equates to variable=value0<< value1. SHFTR variable, value, value1 equates to variable=value0>> value1. BREAK stops execution of script.

Memory operations are also included within the language core operations. Representative examples of memory operations follow.

READ_MEM32 variable, pointer, offset; READ_MEM16 variable, pointer, offset; and READ_MEM8 variable, pointer, offset read 32 bits, 16 bits, or 8 bits of the data at an offset specified by the value of 'offset' in 32 bit, 16 bit, or 8 bit words (specified by the number following READ_MEM) from the memory location pointed by 'pointer' and places the value in the variable 'variable'. The function of operation is much like an array operation.

Example of how this operation relates to a C style array operation:

VDS code:
POINTER DataArray
VARIABLE MyReadValue;
AllocateMemoryBuffer DataArray 32;
READ_MEM16 MyReadValue, DataArray, offset;

C code:
Typedef some TyepThatiI16bitsWideU16;
U16*DataArray=(U16*) malloc(32);
MyReadValue=DataArray[offset];

WRITE_MEM32 pointer, value, offset; WRITE_MEM16 pointer, value, offset; and WRITE_MEM8 pointer, value, offset writes 32 bits, 16 bits, or 8 bits of the data 'value' at an offset specified by the value of 'offset' in 32 bits, 16 bits, or 8 bits (specified by the number following WRITE_MEM) words to the memory location pointed by 'pointer'. This operation works function is much like an array operation.

READ_PCI_MEM32 variable, pointer, offset; READ_PCI_MEM16 variable, pointer, offset; and READ_PCI_MEM8 variable, pointer, offset read 32 bits, 16 bits, or 8 bits of the data at an offset specified by the value of 'offset' in 32 bit, 16 bit, or 8 bit words (specified by the number following READ_PCI_MEM) from the PCI memory address contained in 'pointer' and places the value in the variable 'variable'.

WRITE_PCI_MEM32 pointer, value, offset; WRITE_PCI_MEM16 pointer, value, offset; and WRITE_PCI_MEM8 pointer, value, offset write 32 bits, 16 bits, or 8 bits of the data 'value' at an offset specified by the value of 'offset' in 32 bits, 16 bits, or 8 bits (specified by the number following WRITE_PCI_MEM) words to the PCI memory space address contained in 'pointer'.

READ_PCI_IO32 variable, pointer, offset; READ_PCI_IO16 variable, pointer, offset; and READ_PCI_IO8 variable, pointer, offset read 32 bits, 16 bits, or 8 bits of the data at an offset specified by the value of 'offset' in 32 bit, 16 bit, or 8 bit words (specified by the number following READ PCI_IO) from the PCI IO space address contained in 'pointer' and places the value in the variable 'variable'.

WRITE_PCI_IO32 pointer, value, offset; WRITE_PCI_IO16 pointer, value, offset; and WRITE_PCI_IO8 pointer, value, offset write 32 bits, 16 bits, or 8 bits of the data 'value' at an offset specified by the value of 'offset' in 32 bits, 16 bits, or 8 bits (specified by the number following WRITE_PCI_IO) words to the PCI IO space address contained in 'pointer'.

READ_PCI_CONFIG32 variable, pointer, offset; READ_ PCI_CONFIG16 variable, pointer, offset; and READ_PCI_ CONFIG8 variable, pointer, offset read 32 bits, 16 bits, or 8 bits of the data at an offset specified by the value of 'offset' in 32 bits, 16 bits, or 8 bit words (specified by the number following READ_PCI_CONFIG) from the PCI configuration space address contained in 'pointer' and places the value in the variable 'variable'.

WRITE_PCI_CONFIG32 pointer, value, offset; WRITE_PCI_CONFIG16 pointer, value, offset; and WRITE_PCI_CONFIG8 pointer, value, offset write 32 bits, 16 bits, or 8 bits of the data 'value' at an offset specified by the value of 'offset' in 32 bits, 16 bits, or 8 bits (specified by the number following WRITE_PCI_CONFIG) words to the PCI configuration space address contained in 'pointer'.

GET_PCI_DEVICE_LOCATION pointer, vendorID, deviceID, index retrieves the PCI location of a PCI device with vendor ID 'vendorID' and device ID 'deviceID' and places the location in pointer 'pointer'. The value 'index' denotes which device shall be returned. An index of 1 indicates the first device found in the search, an index of 2 indicates the second device found in the search and so on. If pointer is zero after executing the GetDevicePCILocation operation, no devices were found or less devices were found than the value index passed in.

GET_PCI_MEMORY_REGION_BASE regionBaseAddress, pointer, regionNumber retrieves the PCI region base address number 'regionNumber' of the PCI device located at PCI location 'pointer' and places it into pointer 'regionBaseAddress'.

AllocateMemoryBuffer pointer, value allocates a memory buffer that is value bytes in size and sets the pointer to point the location of the beginning of the buffer.

MemorySet pointer, value0 value1 fills the buffer pointer to by 'pointer' with the value specified by 'value0' (this operation uses only the first byte of value0). The number of bytes filled with 'value0' is specified in bytes by 'value1'.

MemoryCompare variable, pointer0, pointer1, value compares 'value' bytes of two locations pointed to by pointer0 and pointer1. The comparison result is placed in the symbol variable. Zero indicates they are exactly the same. Any other value indicates they differ.

MemoryCopy pointer0, pointer1, value copies 'value' bytes from the memory location pointer1 to memory location pointer0.

ReadFileToBuffer pointer, variable, string opens the file named 'string' and copies the entire contents into a memory buffer whose location is placed into the symbol 'pointer'. The number of bytes written into the memory buffer is placed into the symbol 'variable'.

WriteBufferToFile pointer, variable, string writes 'variable' number of bytes written from the memory buffer at location 'pointer' into the file named 'string'. The actual number of bytes written to the file is placed into symbol 'variable'. So if the value of symbol 'variable' before executing WriteBufferToFile is not equal to the value of symbol 'variable' after executing WriteBufferToFile, the write failed for some reason and only the value of symbol 'variable' bytes were written.

MptGetDevice pointerDevice, index searches the host system for MPT compliant device recognized by the execution host. The pointer 'pointerDevice will be modified to contain a pointer to the MPT device found. The actual meaning of this value is dependent on the implementation of the execution host. The value 'index' specifies which device found will be returned (e.g., index=0, the first device found, index=6, the seventh device found). If 'pointerDevice' is zero after executing an MptGetDevice function, then no device was found or less than number 'index' devices were found.

Example of how to us MptGetDevice find all MPT compliant devices in a system:
ASSIGN index, 0;
LABEL loop;
MptGetDevice pointerDevice, index;
CONDITION pointerDevice, ==, 0; JUMP end;
do something to MPT device that was found
ADD index, index, 1;
JUMP loop;
LABEL end;
BREAK;

MptGetDevice pointerDevice, vendorID, deviceID, revisionID, deviceLocation retrieves information about the MPT device pointed to by 'pointerDevice'. The value of symbol 'vendorID' is modified to contain the vendor ID of the MPT compliant device specified by 'pointerDevice'. The value of symbol 'deviceID' is modified to contain the device ID of the MPT compliant device that was found. The value of symbol 'deviceLocation' will be the 16 bit device location called out in the PCI BIOS specification. That means that bits 15:8 is the bus number, bits 7:3 are the device number and bits 2:0 are the function number. This information can be used to determine if an Mpt device that was found is a function on the same PCI device as another Mpt device.

MptGetDeviceRegisterIOBase pointerBase, pointerDevice modifies symbol 'pointerBase' to be the register PCI I/O base address of the MPT device pointed to by 'pointerDevice'.

MptGetDeviceRegisterMemoryBase pointerBase, pointerDevice modifies symbol 'pointerBase' to be the register PCI memory base address of the MPT device pointed to by 'pointerDevice'.

MptGetDeviceRegisterMemoryMask pointerBase, pointerDevice modifies symbol 'pointerBase' to be the PCI memory mask of the register base address of the MPT device pointed to by 'pointerDevice'.

MptGetDeviceDiagnosticMemoryBase pointerBase, pointerDevice modifies symbol 'pointerBase' to be the register PCI memory base address of the MPT device pointed to by 'pointerDevice'.

MptGetDeviceDiagnosticMemoryMask pointerBase, pointerDevice modifies symbol 'pointerBase' to be the PCI memory mask of the register base address of the MPT device pointed to by 'pointerDevice'.

MptMemDiagRead32 variable, pointerDevice, address; MptMemDiagRead16 variable, pointerDevice, address; and MptMemDiagRead8 variable, pointerDevice, address read 32 bits, 16 bits, or 8 bits (specified by the number following MptMemDiagWrite) of data from the internal address space of an MPT compliant device at address 'address' using memory mapped diagnostic mode. The value read will be stored in the variable 'variable'. The pointer 'pointerDevice' must be a pointer to an MPT device returned by GetMptDevice. If memory mapped diagnostic mode is not enabled on the MPT device pointed to by 'pointerDevice'. MptMemDiagRead will enable memory mapped diagnostic mode.

MptMemDiagWrite32 pointerDevice, address, value; MptMemDiagWrite16 pointerDevice, address, value; and MptMemDiagWrite8 pointerDevice, address, value writes 32 bits, 16 bits, or 8 bits of data 'value' at an offset 'offset' in 32 bits, 16 bits or 8 bits (specified by the number following WRITE_PCI_CONFIG) words to the internal address space of an MPT compliant device at address 'address' using memory mapped diagnostic mode. The pointer 'pointerDevice' must be a pointer to an MPT device returned by GetMptDevice. If memory mapped diagnostic mode is not enabled on the MPT device pointed to by 'pointerDevice', MptMemDiagWrite will enable memory mapped diagnostic mode.

MptIODiagRead32 variable, pointerDevice, address; MptIODiagRead16 variable, pointerDevice, address; and MptIODiagRead8 variable, pointerDevice, address read 32 bits, 16 bits, or 8 bits (specified by the number following MemDiagWrite) of data from the internal address space of an MPT compliant device at address 'address' using IO mapped diagnostic mode. The value read will be stored in the variable 'variable'. The pointer 'pointerDevice' must be a pointer to an MPT device returned by GetMptDevice. If I/O diagnostic mode is not enabled on the MPT device pointed to by 'pointerDevice', MptMemDiagRead will enable I/O diagnostic mode.

MptIODiagWrite32 pointerDevice, address, value; MptIODiagWrite16 pointerDevice, address, value; and MptIODiagWrite8 pointerDevice, address, value write 32 bits, 16 bits, or 8 bits (specified by the number following WRITE_PCI_CONFIG) of data 'value' to the internal address space of an MPT compliant device at address 'address' using IO mapped diagnostic mode. The pointer 'pointerDevice' must be a pointer to an MPT device returned by GetMptDevice. If I/O diagnostic mode is not enabled on the MPT device pointed to by 'pointerDevice', MptMemDiagRead will enable I/O diagnostic mode.

For the following functions, the status or return value of the function is placed in a variable 'variable'. For example, a function status (or return value) of zero means success and a function status of non-zero means a failure occurred. The pointer 'pointerDevice' must be a pointer to an MPT device returned by GetMptDevice. MptEnableDiagModeMem pointerDevice, variable enable Memory mapped diagnostic mode on an MPT compliant device. MptDisableDiagModeMem pointerDevice, variable disables memory mapped diagnostic mode on an MPT compliant device. MptUnlockDiagRegMem pointerDevice, variable unlocks the diagnostic register on an MPT compliant device. MptLockDiagRegMem pointerDevice, variable locks the diagnostic register on an MPT compliant device. MptEnableIOpArmMem pointerDevice, variable enables the IOP ARM on an MPT compliant device. MptDisableIOpArmMem pointerDevice, variable disables the IOP ARM on an MPT compliant device. MptResetDeviceMem pointerDevice, variable resets an MPT compliant device. MptEnableDiagModeIO pointer Device, variable enables IO mapped diagnostic mode on an MPT compliant device. MptDisableDiagModeIO pointerDevice, variable disables Memory mapped diagnostic mode on an MPT compliant device. MptUnlockDiagRegIO pointer, variable unlocks the diagnostic register on an MPT compliant device. MptLockDiagRegIO pointer, variable locks the diagnostic register on an MPT compliant device. MptEnableIOpArmIO pointerDevice, variable enables the IOP ARM on an MPT compliant device. MptDisableIOpARMIO pointerDevice, variable disables the IOP ARM on an MPT compliant device. MptResetDeviceIO pointerDevice, variable resets an MPT compliant device.

Figure 8:
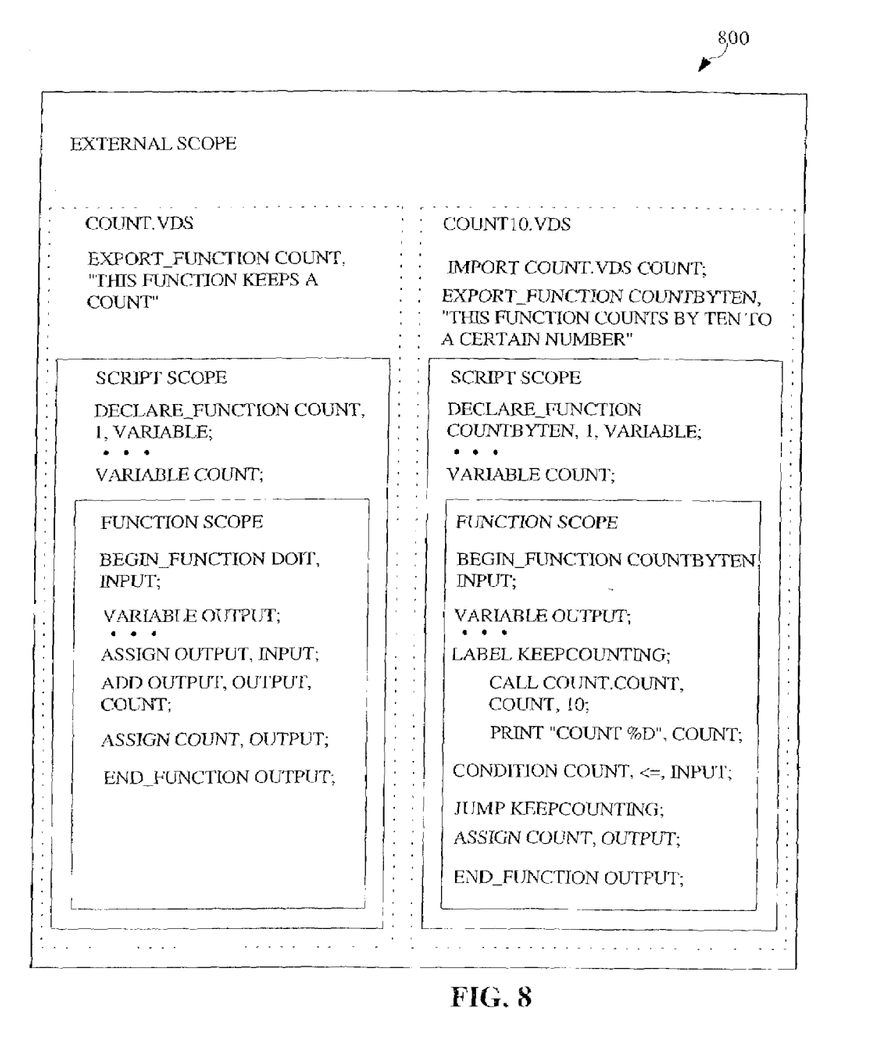
FIG. 8 illustrates three-scope level of a script useable with the present invention.

FIG. 8 illustrates symbol scope in the VDS programming language. For a script, there are three scope levels. The first scope is referred to as the script scope. The script scope encompasses all variables, pointers, labels, and function symbols declared in the script outside of BEGIN_FUNCTION and END_FUNCTION pairs. All statements within the script may access any of these symbols. The next scope is the external scope. This scope encompasses only symbols declared in the script scope of other script files that included using the IMPORT directive and exported in particular script containing the symbol using the EXPORT directive on the function symbol. The third scope is the function scope. The function scope is all variables, pointers, labels, and functions declared in between BEGIN_FUNCTION and END_FUNCTION operations. Each function has its own scope separate from all other function scopes. All symbols declared in the script scope above the function scope are accessible from within the function scope.

A stack is reserved memory used for storage of information for PUSH and POP operations. Variables, functions, labels, and pointers are not stored on the stack but in the symbol table. The stack is used to pass values into and out of functions, and to save information such as the current execution pointer when a branch instruction is used. If a script uses the PUSH and POP operations explicitly, careful attention should be paid to the operations that have a stack side effect.

Stack Side Effect Operations:
BRANCH (PUSH)
RETURN (POP)
CALL (PUSH, POP)
BEGIN_FUNCTION (POP)
END_FUNCTION (PUSH)

The stack container size shall be the size of the largest container for a symbol type or constant type. The stack size is dependent on the implementation. An exemplary stack has 2048 entries.

Each scope has a symbol table that contains the current value of the symbols. The symbol table is similar to a register file whose size is configurable. The programmer may assign values to the symbol table. All declared symbol names may have a symbol table entry to store the value of the symbol and have the capability to be associated with uses of that symbol in other operations. All symbols used in statements will then effectively be compiled into a reference that will denote the location in the symbol table for that symbol's value. The location of the symbol table is not limited by the programming language but is effectively limited by the constraints of the execution host.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

APPENDIX

```
Sample VDS source for firmware download boot.
# Firmware Download Boot IO Script
Revision History:
Author     Date          Comments
---------  -----------   -----------------------------
CEG        03/26/02      Initial revision
CEG        04/15/02      Revised to make VDS 0.02 compliant
CEG        05/13/02      Revised to make VDS 0.03 compliant
'EXPORT FwDownloadBootIO "Loads a firmware image file through firmware
download boot procedure to an MPT device using PCI I/O space"
    %NAME                    "FwDownloadBootIO"
    %VERSION                 "01.02"
    %PURPOSE                 "Loads a firmware image file through
FwDownloadBoot procedure to an MPT device"
    %SUPPORTED_DEVICES       "1030"
    FUNCTION                 FwDownloadBootIO, 2, STRING, POINTER;
    POINTER                  PtrMptDevice;
    POINTER                  FileName;
    VARIABLE                 Status;
    # A simple main used to execute the FwDownloadBoot function by running this
script.
    LABEL ENTRY_MAIN;
    # Get a file name
    GetUserString FileName, "Firmware Image Filename";
    # Get an Mpt device to operate on
    GetMptDevice PtrMptDevice;
    CALL FwDownloadBoot, Status, FileName, PtrMptDevice;
    BREAK;
    # FUNCTION:               FwDownloadBoot
    # INPUT:                  FileName - The name of the firmware image file
    # PtrMptDevice - a pointer to the IOBase Address of the device to load
    # OUTPUT:                 status 0x00 - good
    # status 0x01 - failure
    # DESCRIPTION:
    # Uses the fwdownloadboot procedure to load a firmware image into an Mpt
    # device
    BEGIN_FUNCTION FwDownloadBootIO, FileName, PtrMptDevice;
    VARIABLE numBytesInFirmwareImage;
    POINTER ptrFile;
    VARIABLE status;
    ASSIGN      status, 1;
    CONDITION FileName, ==, 0;      Print "Error: File name string is empty or
unassigned\n";
    CONDITION FileName, ==, 0;      JUMP EndOfFunction;
    CONDITION PtrMptDevice, ==, 0;  Printer "Error: Pointer to MPT device is
NULL (0)\n";
    CONDITION PtrMptDevice, ==, 0;  JUMP EndOfFunction;
    # Open a buffer of the file passed in
    ReadFileToBuffer ptrFile, numBytesInFirmwareImage, FileName;
    # Enable diag mode, Disable the Iop
    MptEnableDiagModeIO PtrMptDevice, status;
    CONDITION status, !=, 0; Print "Error: Unable to enable diagnostic mode\n";
    CONDITION status, !=, 0; JUMP EndOfFunction;
    MptDisableIOpArmIO PtrMptDevice, status;
    CONDITION status, !=, 0; Print "Error: Unable to disable the iop\n";
    CONDITION status, !=, 0; JUMP EndOfFunction;
    # TODO verify signature of firmware image;
    # Copy all images to load start address in firmware image header for that image
    VARIABLE loadStartAddress;
    VARIABLE nextImageOffset;
    VARIABLE imageSize;
    VARIABLE imageOffset;
    VARIABLE byteCount;
    VARIABLE checksum;
    VARIABLE temp;
    ASSIGN imageOffset, 0;
    LABEL WriteNextFirmwareImage;
    Print "Writing Firmware Image at offset %x\n", ImageOffset;
    ASSIGN byteCount, 0;
    ADD Temp, imageOffset, 0x34;
    READ_MEM32 loadStartAddress, PtrFile, 0x2C;
    Print "Image Size %x\n", imageSize;
```

APPENDIX-continued

```
ADD temp, imageOffset, 0x30;
READ_MEM32 nextImageOffset, ptrFile, temp;
# Write Firmware image to the LoadStartAddress;
LABEL WriteFirmwareImageLoop;
READ_MEM32 temp, ptrFile, byteCount;
MptIODiagWrite32 PtrMptDevice, loadStartAddress, temp;
ADD loadStartAddress, loadStartAddress, 4;
ADD byteCount, byteCount, 4;
CONDITION byteCount, <=, imageSize; JUMP WriteFirmwareImageLoop;
ASSIGN ByteCount, 0;
ADD Temp, imageOffset, 0x34;
READ_MEM32 loadStartAddress, PtrFile, Temp;
ASSIGN checksum, 0;
ASSIGN byteCount, 0;
ADD Temp, imageOffset, 0x34;
READ_MEM32 loadStartAddress, PtrFile, Temp;
# Check sum the firmware image that was written and verify zero sum
LABEL ChecksumFirmwareImageLoop;
MptIODiagRead32 PtrMptDevice, loadStartAddress, temp;
ADD loadStartAddress, loadStartAddress, 4;
ADD byteCount, byteCount, 4;
ADD checksum, checksum, temp;
CONDITION byteCount, <=, imageSize; JUMP CheckSumFirmwareImageLoop;
Print "Checksum %x\n", checksum;
CONDITION checksum, !=, 0; JUMP ChecksumFailure;
CONDITION nextImageOffset, ==, 0; JUMP AllImagesWritten;
ASSIGN imageOffset, nextImageOffset;
JUMP WriteNextFirmwareImage;
LABEL AllImagesWritten;
VARIABLE ioResetVectorRegAddr;
VARIABLE iopResetVectorValue;
# Set the Arm reset vector
Print "Setting reset vector \n";
READ_MEM32 iopResetVectorRegAddr, PtrFile, 0x3C;
READ_MEM32 iopResetVectorValue, PtrFile, 0x38;
MptIODiagWrite32          PtrMptDevice,     iopResetVectorRegAddr,
iopResetVectorValue;
# Clear Flash Bad Signature
Print "Clearing flash bad sig\n";
# ++ 1030 Workaround
MptIODiagRead32 PtrMptDevice, 0x3F000000, temp;
OR temp, temp, 0x40000000;
MptIODiagWrite32 PtrMptDevice, 0x3F000000, temp;
# -- 1030 Workaround
# Enable the IOP and disable diagnostic mode
Print "Turning Arm on\n";
EnableIOPArmIO PtrMptDevice, status;
CONDITION status, !=, 0; Print "Error: Failure occurred during the enabling of
the IOP\n";
CONDITION status, !=, 0; JUMP EndOfFunction;
DisableDiagModeIO PtrMptDevice, status;
CONDITION status, !=, 0; Print "Error: Failure occurred during the disabling of
diagnostic mode\n";
CONDITION status, !=, 0; JUMP EndOfFunction;
ASSIGN status, 0x00;
JUMP EndOfFunction;
LABEL ChecksumFailure;
Print "Checksums Failure, Aborting Firmware download\n";
ASSIGN status, 0x01;
LABEL EndOfFunction;
END_FUNCTION status;
```

What is claimed is:

1. A method for testing a device through a host machine, comprising:
    accessing the device under test;
    entering a near natural language command, wherein the near natural language comprises Validation Diagnostic Script and multiple near natural language commands are executed simultaneously;
    interpreting the near natural language command;
    performing at least one diagnostic or validation operation associated with the near natural language command on the device; and
    examining a result of the at least one diagnostic or validation operation.

2. The method of claim 1, wherein entering a near natural language command is performed on a prompt line of a graphical user interface by an operator.

3. The method of claim 1, wherein entering a near natural language command is performed from a file.

4. The method of claim 3, wherein the method is performed from the file by the host machine without prior code compilation.

5. The method of claim 1, wherein entering a near natural language command is performed through the manipulation of graphical objects on a graphical user interface.

6. The method of claim 5, wherein a portion of the graphical objects are functions.

7. The method of claim 6, wherein another portion of the graphical objects designate source and destination devices.

8. The method of claim 7, wherein the source and destination devices are presented as a common set of graphical objects.

9. The method of claim 7, wherein the source and destination devices are presented as unique sets of graphical objects.

10. The method of claim 1, wherein the device under test is accessed through a diagnostics port.

11. The method of claim 1, wherein the device under test is accessed by a remote host machine.

12. The method of claim 11, wherein the device under test and the host machine communicate over a network.

13. The method of claim 12, wherein the network is the Internet.

14. The method of claim 1, wherein the method includes automated regression testing.

15. A method for testing a device through a host machine, comprising:
  accessing the device under test;
  entering a near natural language command, wherein the near natural language comprises Validation Diagnostic Script;
  interpreting the near natural language command;
  performing at least one diagnostic or validation operation associated with the near natural language command on the device; and
  examining a result of the at least one diagnostic or validation operation;
wherein the method includes automated regression testing and the host machine schedules the time of the automated regression testing.

16. A method for testing a device through a host machine, comprising:
  accessing the device under test;
  entering a near natural language command, wherein the near natural language comprises Validation Diagnostic Script, entering a near natural language command is performed from a file, and previously written script files have been imported into the file;
  interpreting the near natural language command;
  performing at least one diagnostic or validation operation associated with the near natural language command on the device; and
  examining a result of the at least one diagnostic or validation operation.

17. A program of instructions fixed in a tangible medium readable by an information handling system for causing the information handling system to execute steps for performing diagnostic and/or validation operations on a device under test, the steps comprising:
  accessing the device under test;
  locking a diagnostics register on the device under test;
  entering a near natural language command, wherein the near natural language comprises Validation Diagnostic Script;
  interpreting the near natural language command;
  performing at least one diagnostics or validation operation associated with the near natural language command on the device;
  examining a result of the at least one diagnostic or validation operation.

18. The program of instructions of claim 17, wherein the information handling system includes a host machine and a device under test.

19. The program of instructions of claim 17, further comprising enabling an input/output processor.

20. The program of instructions of claim 17, wherein the instructions are in a near natural language programming language.

21. A program of instructions fixed in a tangible medium readable by an information handling system for causing the information handling system to execute steps for performing diagnostic and/or validation operations on a device under test, the steps comprising:
  accessing the device under test;
  enabling an input/output processor, wherein the input/output processor is an Advanced RISC Machine processor;
  entering a near natural language command, wherein the near natural language comprises Validation Diagnostic Script;
  interpreting the near natural language command;
  performing at least one diagnostics or validation operation associated with the near natural language command on the device;
  examining a result of the at least one diagnostic or validation operation.

22. A program of instructions fixed in a tangible medium readable by an information handling system for causing the information handling system to execute steps for performing diagnostic and/or validation operations on a device under test, the steps comprising:
  accessing the device under test, wherein accessing the device under test includes providing vendor identification, device identification, and an index describing the device to be returned;
  entering a near natural language command, wherein the near natural language comprises Validation Diagnostic Script;
  interpreting the near natural language command;
  performing at least one diagnostics or validation operation associated with the near natural language command on the device;
  examining a result of the at least one diagnostic or validation operation.

23. The program of instructions of claim 22, wherein accessing the device under test further includes providing revision identification.

24. A program of instructions fixed in a tangible medium readable by an information handling system for causing the information handling system to execute steps for performing diagnostic and/or validation operations on a device under test, the steps comprising:
  accessing the device under test;
  entering a near natural language command, wherein the near natural language comprises Validation Diagnostic Script;
  interpreting the near natural language command;
  performing at least one diagnostics or validation operation associated with the near natural language command on the device;
  examining a result of the at least one diagnostic or validation operation; wherein the instructions are in a near natural language programming language and have three scope levels.

25. The program of instructions of claim 24, wherein the scope levels are external, script, and function.

26. A program of instructions fixed in a tangible medium readable by an information handling system for causing the information handling system to execute steps for performing diagnostic and/or validation operations on a device under test, the steps comprising:
- accessing the device under test;
- entering a near natural language command, wherein the near natural language comprises Validation Diagnostic Script;
- interpreting the near natural language command;
- isolating one selected from components of the device under test and components of a host machine;
- performing at least one diagnostics or validation operation associated with the near natural language command on the device;
- examining a result of the at least one diagnostic or validation operation.

27. A program of instructions fixed in a tangible medium readable by an information handling system for causing the information handling system to execute steps for performing diagnostic and/or validation operations on a device under test, the steps comprising:
- accessing the device under test;
- entering a near natural language command, wherein the near natural language comprises Validation Diagnostic Script;
- interpreting the near natural language command;
- performing at (east one diagnostics or validation operation associated with the near natural language command on the device;
- examining a result of the at least one diagnostic or validation operation;

wherein a number of bits transferred in a single data transfer operation is selectable.

* * * * *